Figure 6:
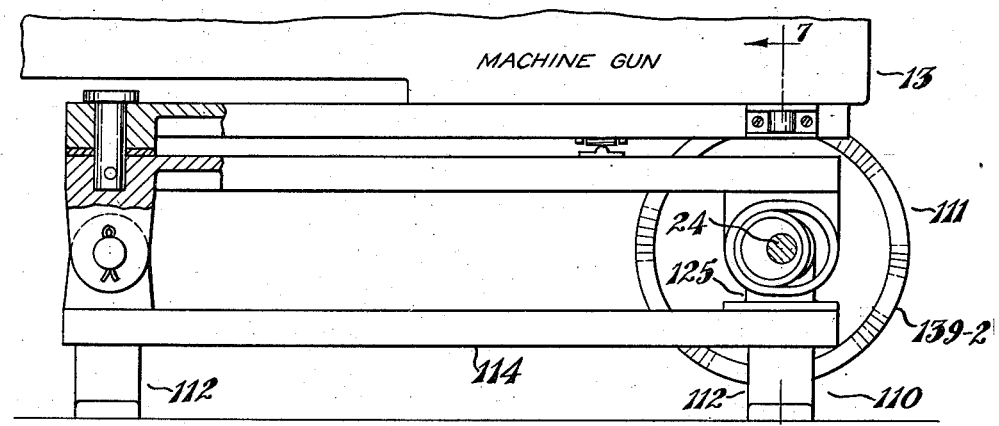

Oct. 28, 1947.  H. F. FREASE  2,429,713
APPARATUS FOR PRODUCING AUTOMATIC SCATTER FIRE
OF A MACHINE GUN AND FOR SIMILAR PURPOSES
Filed May 17, 1941  3 Sheets-Sheet 1
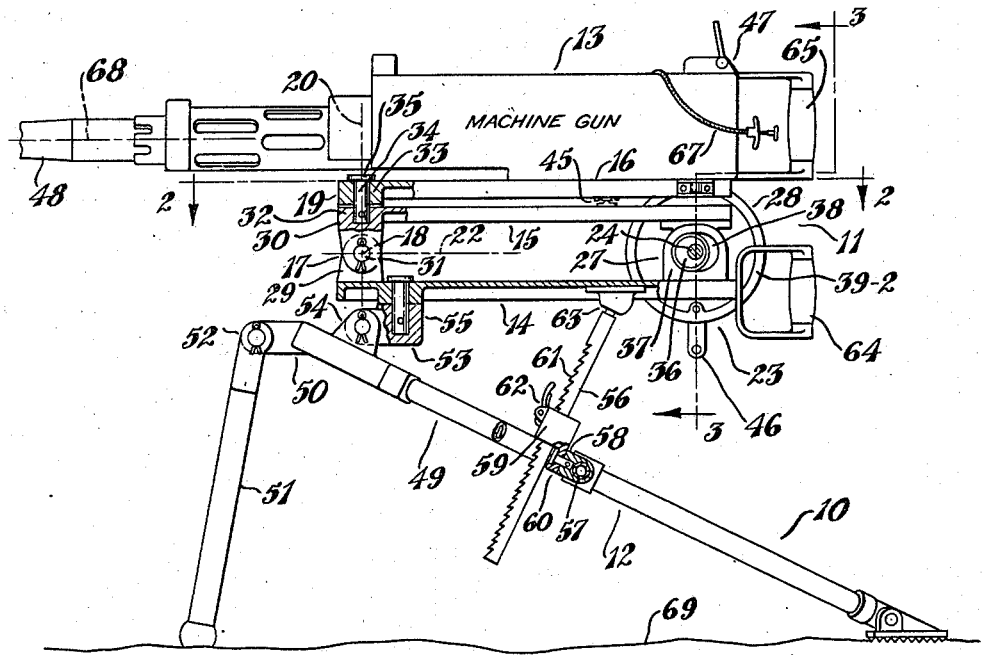
Fig. 1
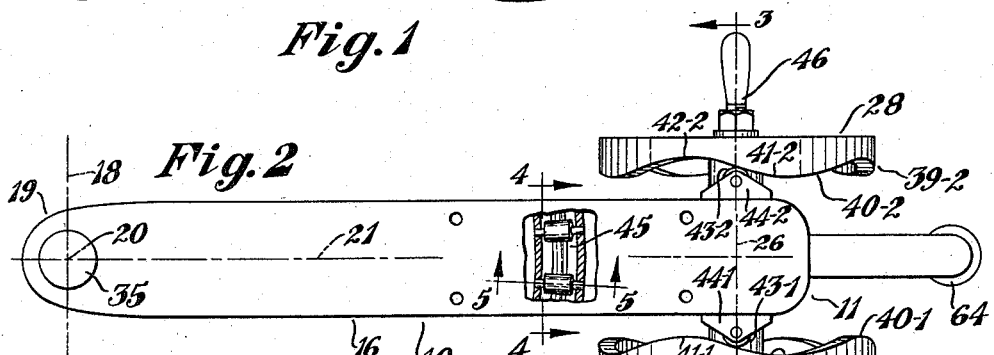
Fig. 2
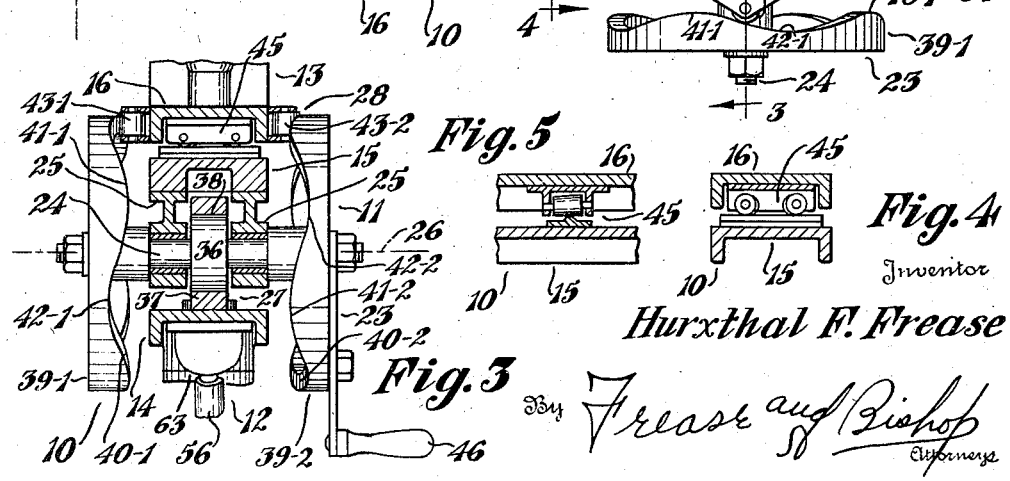
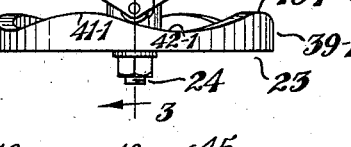
Inventor
Hurxthal F. Frease
By Frease and Bishop
Attorneys Oct. 28, 1947.     H. F. FREASE     2,429,713
APPARATUS FOR PRODUCING AUTOMATIC SCATTER FIRE
OF A MACHINE GUN AND FOR SIMILAR PURPOSES
Filed May 17, 1941     3 Sheets-Sheet 2

Inventor
Hurxthal F. Frease
By Frease and Bishop
Attorneys

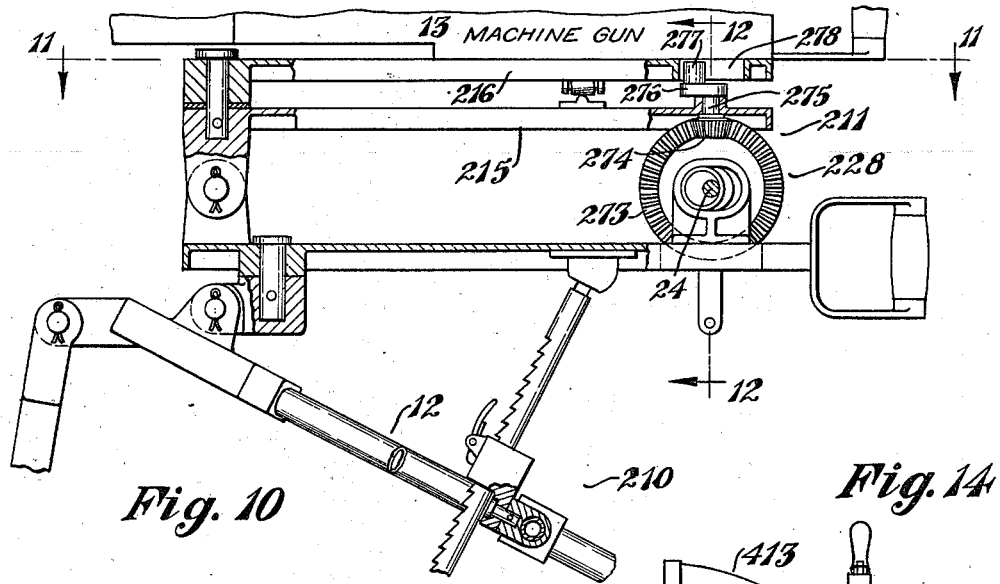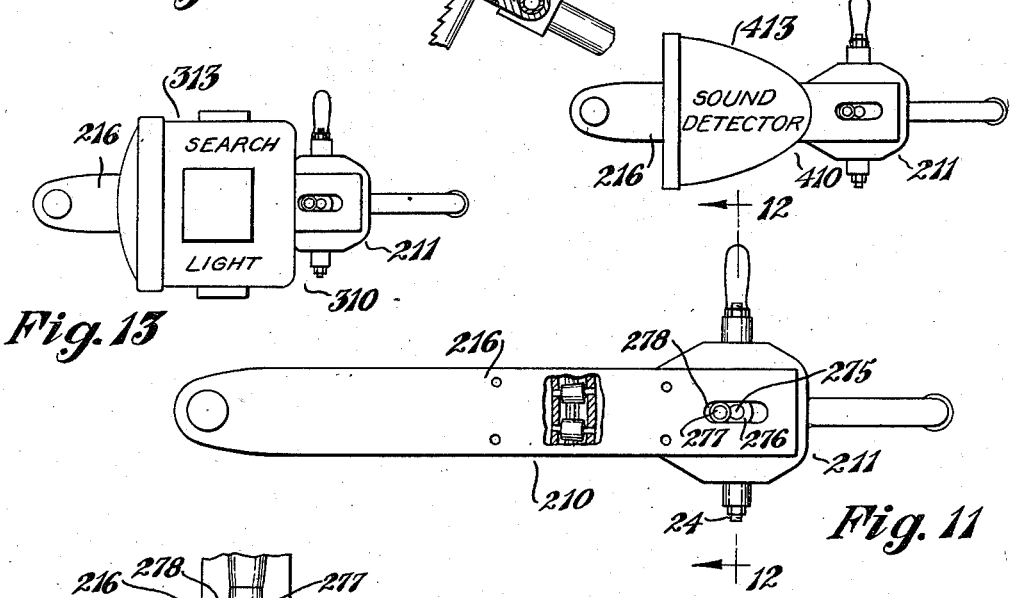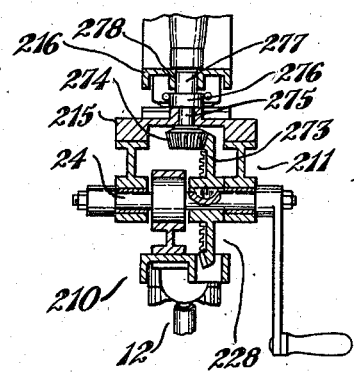

Patented Oct. 28, 1947

2,429,713

UNITED STATES PATENT OFFICE 2,429,713

APPARATUS FOR PRODUCING AUTOMATIC SCATTER FIRE OF A MACHINE GUN AND FOR SIMILAR PURPOSES

Hurxthal F. Frease, Canton, Ohio

Application May 17, 1941, Serial No. 393,954

5 Claims. (Cl. 74—54)

The invention relates to apparatus for producing automatic scatter fire of a machine gun, and for similar purposes, such as the tracing of a repeating pattern over an area by the beam of a searchlight.

Defense forces in war include machine gun squads or units, each numbering a relatively few individual defenders, sometimes as few as one, two, or three, and each of which units operates a machine gun from a fixed defense position against moving attacking or potential attacking enemy offense forces including large numbers of individual armed attackers, such as:

(1) Infantry, advancing columns or deployed;

(2) Artillery, advancing columns;

(3) Cavalry, advancing columns or deployed, or dismounted and deployed;

(4) Troops visible and exposed in motor transport trucks or other automotive land vehicles, such as scout cars, and tanks;

(5) Troops deplaning from transport airplanes which have succeeded in landing on a defense landing field;

(6) Parachute troops landing or assembling for an attack;

(7) Troops disembarking from a ship at a dock; or into small boats; and (8) Landing parties endeavoring to land from small boats on a beach.

Any usual machine gun fires bullets continuously as long as its trigger is pulled, and is obviously superior in fire power to an automatic rifle requiring a separate pull of the trigger for each shot, or a bolt action military rifle requiring operation of the bolt mechanism as well as a pull of the trigger for each shot.

In firing a machine gun the bullets emerge successively in a stream from the muzzle of the barrel at a rate as high as 500 per minute or more.

In the usual operation of a machine gun on a usual field tripod mount, there is a tendency for the bullets to follow or pile up on each other at the end or aim points of their trajectories, because the usual traversing and elevating means of a usual field tripod mount is manually actuated by the machine gun operator, who is physically unable to effect traverse and elevation of the barrel of the machine gun at a speed rapid enough to avoid the piling up of the bullets at the end or aim points of their trajectories. The longer the machine gun is fired by the same operator, the more fatigued he becomes, and the more likely is there to be a wasteful piling up of the bullets on single end or aim points of their trajectories.

The tendency for the bullets to pile up on single end or aim points of their trajectories in usual machine gun fire, places a machine gun unit in a fixed defense position at a distinct disadvantage against moving enemy offense forces including large numbers of individual attackers, such as any of the foregoing eight defined classes or kinds of enemy offense forces.

The trace of the piling up bullets fired from a machine gun on a usual field tripod mount is a line tending to be more arcuate than otherwise, because traverse of the gun barrel is more easily effected than elevation during firing.

Consequently, the machine gun operator in a fixed defense position must either endeavor to aim at a section of an enemy line which will be intersected by his line of fire, or trust that a section of an enemy line will move into his line of fire.

The enemy however is spread or scattered over an area, including many sections of lines some of which are always in motion and outside the line of fire of any particular gun or the lines of fire of any usual battery of machine guns.

In the absence of artillery or air support, effective defense against an enemy offense force including a large number of moving individuals spread or scattered over an area, requires a scattered or hail fire of machine gun bullets continuously over and upon a substantial portion and preferably all of this area until the enemy has been destroyed, or forced to withdraw or surrender.

Such fire power is impractical if not impossible to attain through the fire of machine guns on usual field tripod mounts.

In airplanes with machine guns on usual mounts a similar condition prevails, even though the machine guns are arranged in multiple for firing from a single trigger. When usual multiple fired guns have their barrels parallel in a single plane either in a universal mount for aimed firing by an airplane gunner, or spaced in the airplane wings for head-on fire, the trace of the trajectories are still lines, and the bullets still tend to pile up wastefully at the end points of their trajectories, completely missing the high-speed enemy airplane target in many instances.

Some improvement in an airplane is obtained by arranging the barrels of a battery of multiple fired machine guns in different planes, but here again the piling up tendency is still present for the bullets from each gun of the battery, and the battery covers only a restricted area usually ahead of the fuselage.

Similar disadvantages are inherent in rapid fire defense artillery of heavier caliber than machine guns, such as antiaircraft guns.

Generally speaking therefore, usual defense fire power is inadequate against moving enemy offense forces of all descriptions.

The objects of the present invention include primarily the increasing of defense fire power of all classes of rapid-fire guns, particularly machine guns, by the provision of apparatus for automatically producing scatter fire of such guns and substantially eliminating the tendency of the bullets fired from such guns to pile up at the end or aim points of their trajectories.

Further objects of the present invention include the provision of apparatus for imparting motion: (1) to a projecting device such as a machine gun or a searchlight, so that the projected bullets or beam of light will rapidly and repetitively cover an area of substantial magnitude rather than a single aim point; or (2) to a receiving device such as a camera, a directional radio receiver, or a directional sound wave detector for similar purposes.

Further objects of the present invention include the provision of such motion imparting apparatus and a selected combination thereof with a projecting device, a receiving device, and the like, which may be operated manually with ease, or which may be power driven as by an electric motor.

Further objects of the present invention include the provision of such motion imparting apparatus and a selected combination thereof with a projecting device, a receiving device, and the like, adapted for plural, multiple, or battery operation, so that a battery or batteries of projecting or receiving devices and the like may be arranged to instantaneously cover any desired area under centralized control.

Further objects of the present invention include the provision of such motion imparting apparatus and a selected combination thereof with a projecting device, a receiving device, and the like, the parts of which are of simplified arrangement and construction, and most of which parts may be initially formed by casting as from alloy steel, whereby mass production of the apparatus may be quickly attained with a minimum of machining operations.

Further objects of the present invention include the provision of such motion imparting apparatus particularly adapted for interpositioning between a usual machine gun and a usual field tripod mount, or other usual mount.

The foregoing and other objects are attained by the motion imparting apparatus, and the combinations, sub-combinations, and parts thereof, which comprise the present invention, the nature of which is set forth in the following general statement, and preferred embodiments of which together with their mode of use are set forth by way of example in the following description, and which are particularly and distinctly pointed out and set forth in the appended claims forming part hereof.

The nature of the present invention may be stated in general terms as including in motion imparting apparatus, a base member, an intermediate member, and a mounting member. Preferably hinge means operatively connect the base member and the intermediate member for oscillation with respect to each other about a first axis, and preferably pivot means operatively connect the intermediate member and the mounting member for oscillation with respect to each other about a second axis preferably perpendicular to the first axis, the mounting member also oscillating with the intermediate member about the first axis.

Means including a rotary drive shaft are operatively interposed between the base member and the intermediate member and the mounting member for effecting the oscillations of the members.

The oscillation effecting means preferably include bearing means journalling the drive shaft on a selected one of the members, first rotation to oscillation converting means operatively interposed between the shaft and one of the other two members for effecting one of the oscillations, and second rotation to oscillation converting means operatively interposed between the shaft and the second of the other two members for effecting the other oscillation.

The shaft journalling means are preferably mounted on either the base member or the intermediate member. When the shaft is journalled on the base member, the first rotation to oscillation converting means is operatively interposed between the shaft and the intermediate member, and vice versa.

The second rotation to oscillation converting means is preferably operatively interposed between the shaft and the mounting member.

In one combination, the mounting member has mounted thereon a projecting device, such as a machine gun or a searchlight.

When the mounting member carries a gun, the base member of the improved motion imparting apparatus is secured upon any usual gun mount.

The second oscillation is preferably considerably more rapid than the first oscillation to enable with each rotation of the drive shaft coverage of a substantial area by the projecting or receiving or other device carried by and in combination with the improved motion imparting apparatus.

The invention furthermore includes improved details of construction and arrangement, particularly of the oscillation effecting means and the rotation to oscillation converting means thereof as hereinafter set forth and claimed.

Figures 7, 8:
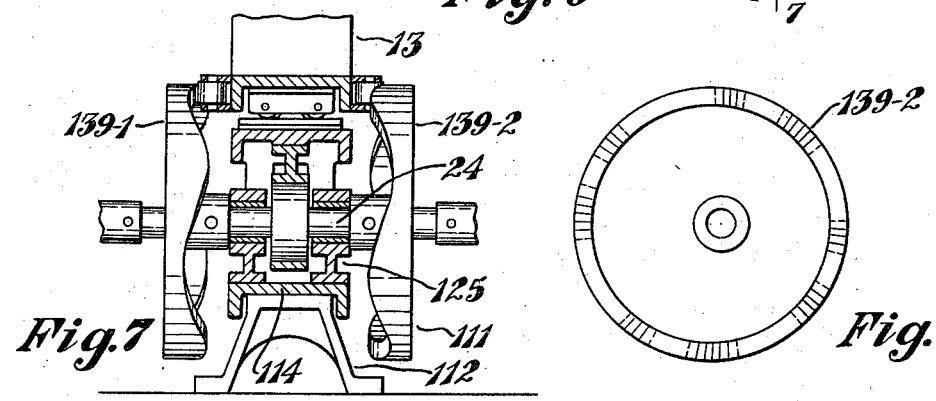

By way of example, embodiments of the improved motion imparting apparatus in combination with projecting and receiving devices are illustrated in the accompanying drawings forming part hereof, in which Figure 1 is a fragmentary side elevation with portions broken away and illustrated in section of a machine gun equipment adapted for field use and including a first embodiment of the motion imparting apparatus of the present invention in combination with a usual field tripod machine gun mount and a usual machine gun shown diagrammatically in part;

Fig. 2, a plan view thereof as on line 2—2, Fig. 1 with the machine gun removed and portions broken away and shown in section;

Fig. 3, a fragmentary transverse sectional view thereof as on lines 3—3, Figs. 1 and 2;

Fig. 4, a transverse sectional view thereof as on line 4—4, Fig. 2, with distant parts removed;

Fig. 5, a fragmentary sectional view thereof as on line 5—5, Fig. 2;

Fig. 6, a side elevation with portions broken away and shown in section of a machine gun equipment including a second embodiment of the motion imparting apparatus of the present invention in combination with a usual machine gun shown diagrammatically and a fixed mount for operation from a position such as the wing of an airplane, or head-on from the fuselage of an airplane;

Fig. 7, a fragmentary sectional view thereof as on line 7—7, Fig. 6.

Figure 9:
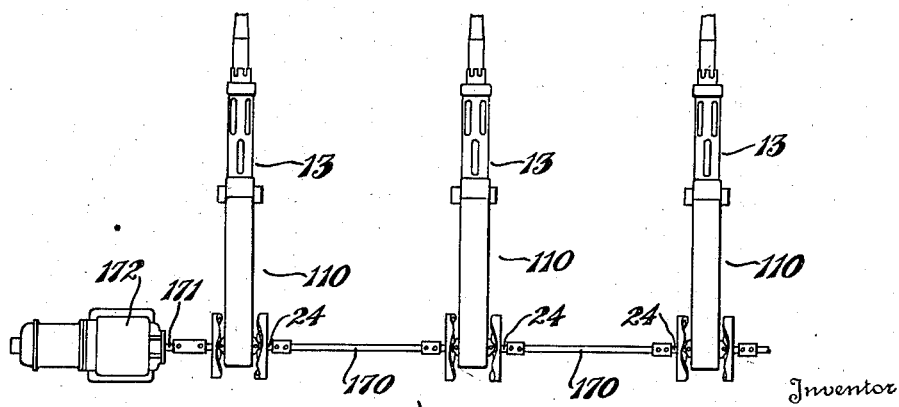

Fig. 8, a detached view of one of the eccentric side cams of the motion imparting apparatus of Figs. 6 and 7;

Fig. 9, a fragmentary top plan view showing a battery of machine gun equipments of Figs. 6 and 7 including shafts connecting their drive shafts and arranged for simultaneous power operation by a motor;

Fig. 10, a fragmentary elevation view with portions in section of a machine gun equipment generally similar to Fig. 1, but including a third embodiment of the motion imparting apparatus of the present invention;

Fig. 11, a plan view thereof as on line 11—11, Fig. 10 with the machine gun removed and portions broken away and shown in section;

Fig. 12, a fragmentary transverse sectional view thereof as on lines 12—12, Figs. 10 and 11;

Fig. 13, a plan view illustrating a motion imparting apparatus similar to that shown in Figs. 10 to 12 inclusive and upon which is mounted a searchlight projecting device shown diagrammatically; and Fig. 14, a similar view showing a similar motion imparting apparatus mounting a receiving device shown diagrammatically and which may be a sound detector.

Similar numerals refer to similar parts throughout the several views.

In Figs. 1 to 5 inclusive, improved machine gun equipment adapted for field use is indicated generally by 10, and includes a first embodiment of the motion imparting apparatus of the present invention indicated generally by 11 in combination with a field tripod machine gun mount indicated generally by 12 and a machine gun indicated generally by 13 shown diagrammatically in part, the gun mount 12 and the machine gun 13 being of more or less usual construction.

The motion imparting apparatus 11 includes an elongated base member indicated generally by 14 and an elongated intermediate member indicated generally by 15 and an elongated mounting member indicated generally by 16.

Preferably at one end, the base member 14 and the intermediate member 15 are operatively connected preferably by hinge means indicated generally by 17 for oscillation with respect to each other about a first axis 18 shown as a dot-dash line in Fig. 2 and as the intersection of dot-dash lines shown in Fig. 1.

The intermediate member 15 and the mounting member 16 are operatively connected preferably by pivot means indicated generally by 19 for oscillation with respect to each other about a second axis 20 preferably perpendicular to and intersecting the first axis 18, the axis 20 being shown as a dot-dash line in Fig. 1 and at the intersection of the axis 18 with a dot-dash line 21 in Fig. 2.

As shown, similarly, the intersection indicating the axis 18 in Fig. 1 is that of the second axis of oscillation 20 with a dot-dash line 22.

Preferably at the other end of the motion imparting apparatus 11, means indicated generally by 23 and including a rotary drive shaft 24 are operatively interposed between the base member 14 and the intermediate member 15 and the mounting member 16 for effecting the oscillations of the members.

The oscillation effecting means 23 preferably include preferably laterally spaced sets of bearing means 25 journalling the drive shaft 24 on a selected one of the members. As shown in the motion imparting apparatus 11, the drive shaft 24 is journalled on the intermediate member 15 for rotation about the axis of the drive shaft 24 indicated by the dot-dash line 26 which as shown and preferably is parallel to the first axis of oscillation 18.

The oscillation effecting means 23 furthermore includes first rotation to oscillation converting means indicated generally by 27 operatively interposed between the shaft 24 and one of the other two members which in the apparatus 11 is the base member 14 for effecting one of the oscillations, and second rotation to oscillation converting means indicated generally by 28 operatively interposed between the shaft 24 and the second of the other two members which in the apparatus 11 is the mounting member 16 for effecting the other oscillation.

The first oscillation is about the axis 18, which is the axis of the hinge means 17 connecting the base member 14 with the intermediate member 15. As shown the base member 14 is preferably an integral casting or forging of alloy steel or other suitable metal, and the intermediate member 15 and the mounting member 16 are likewise preferably of similar integral cast or forged metal construction.

The hinge means 17 as shown include laterally spaced ears 29 preferably extending integrally upwardly from the base member 14 and overlapping laterally spaced ears 30 preferably extending integrally downwardly from the intermediate member 15.

The overlapping ears 29 and 30 have suitable registering bearing apertures formed therein, and a hinge pin 31 extends through the bearing apertures of the overlapping ears 29 and 30, the hinge pin 31 being suitably secured for selective withdrawal from the bearing apertures as by cotter pin means as shown in Fig. 1.

The second axis of oscillation 20 is the axis of the pivot means 19 which as shown includes a boss 32 on the intermediate member 15 and a boss 33 on the mounting member 16. The bosses 32 and 33 have suitable registering apertures formed therein and a pivot pin 34 extends through the registering apertures in the bosses 32 and 33 and has an upper head 35 abutting against an upper face of the boss 33, and the lower end of the pivot pin 34 is secured by a transverse pin in the boss 32 as shown in Fig. 1.

In the motion imparting apparatus 11, as shown, the first rotation to oscillation converting means 27 is an eccentric and slot means including an eccentric 36 secured upon the shaft 24 between the bearing means 25 and a slotted eccentric bearing member 37 secured to and extending upwardly from the base member 14 and having an elongated slot 38 in which the eccentric 36 operates, the elongation in the slot 38 extending in the direction of elongation of the base member 14 and the intermediate member 15.

In the motion imparting apparatus 11, as shown, the second rotation to oscillation converting means 28 includes cylindric side cams 39—1 and 39—2 which are secured on extensions of the shaft 24 on opposite sides of the base member 14, intermediate member 15 and mounting member 16.

The cylindric side cam 39—1 has a side cam face 40—1 which is of scallop formation and includes a plurality of equally radially spaced continuous hills and valleys 41—1 and 42—1 merging into each other in smooth curves.

On the adjacent side of the mounting member 16, a cam follower roller 43—1 is journalled as by a bearing bracket 44—1, and the roller 43—1 operates against the side cam face 40—1.

The other side cam 39—2 has a side cam face 40—2 including hills 41—2 and valleys 42—2 located opposite the valleys and hills 42—1 and 41—1 of the side cam face 40—1, the opposite side cam faces 40—1 and 40—2 thus supplementing each other. A cam follower roller 43—2 is secured as by a bearing bracket 44—2 on the other side of the base member 16, and the roller 43—2 operates against the side cam face 40—1.

The supplementary side cam faces 40—1 and 40—2 operating against the opposite cam follower rollers 43—1 and 43—2 on opposite sides of the mounting member 16 serve to oscillate the mounting member 16 laterally about the pivot axis 20 between extreme positions on opposite sides of the axis 21 during each rotation of the shaft 24, once for each lateral displacement of each roller from one position on its controlling cam face to the next similar position, thereby enabling any desired plurality of lateral oscillations of the mounting member 16 in the motion imparting apparatus 11 for each rotation of the shaft 24.

On the other hand, for each rotation of the shaft 24, the cam and slot rotation to oscillation converting means 27 produces but one upwards and downwards oscillation of the intermediate member 15 and the base member 14 with respect to each other.

Roller and track means indicated generally by 45 are interposed between the intermediate member 15 and the mounting member 16 intermediate the ends thereof, for providing a suitable support for the machine gun 13 during the lateral oscillations of the mounting member 16.

In the motion imparting apparatus 11, a crank handle 46 is secured upon one end of the shaft 24, which as shown is on the right hand end thereof when looking in the direction of the arrows 3—3, the operator of the machine gun equipment 10 normally standing behind the oscillation effecting means 23, the rear end 47 of the machine gun being located immediately thereabove and the barrel 48 of the machine gun 13 extending forwardly beyond the other end of the mounting member 16, and the axis of the machine gun barrel 48 preferably intersecting the upwardly extending axis of oscillation 20.

The field tripod machine gun mount 12 is of a more or less usual construction including a rearwardly extending yoke frame 49 terminating in an upper apex fitting 50, and an upwardly and downwardly extending front strut member 51 has its upper end connected with the fitting 50 for swinging adjustment with respect thereto as by hinge means indicated by 52, generally similar to the hinge means 17.

A bearing block 53 rearwardly of the hinge means 52 and above the fitting 50 is connected for upwards and downwards swinging on the fitting 50 as by hinge means indicated generally by 54, generally similar to the hinge means 17 and 52.

The bearing block 53 is operatively connected for lateral swinging thereon of the base member 14 of the motion imparting apparatus 11 as by pivot means indicated generally by 55, generally similar to the pivot means 19.

The yoke frame has a lower cross bar member 57, and a ratchet strut 56 extends upwardly from one side of the cross bar member 57.

An upwardly and downwardly oscillating bearing block 58 is journalled on the cross bar member 57.

A laterally oscillating ratchet strut slide sleeve 59 is mounted for lateral oscillations on the upward and downwardly oscillating bearing block 58 as by pivot means 60 similar to the pivot means 55 and 19.

The ratchet strut 56 extends through the sleeve 59, and the ratchet strut 56 has on the forward face thereof ratchet teeth 61 of such form to permit upper ratcheting and downward stopping of the ratchet strut 56, preferably under the control of releasable ratchet latch means indicated generally by 62 which are operatively mounted on the sleeve 59 for cooperation with the ratchet teeth 61 in a usual manner.

The upper end of the ratchet strut 56 is connected by ball and socket means 63 with the under part of the base member 14 of the motion imparting apparatus 11.

At the rear end of the base member 14, a handle 64 is provided which corresponds with the usual handle 65 of the machine gun 13.

The machine gun equipment 10 is set up for right hand operation of the crank 46 for the shaft 24.

In the case of a usual machine gun 13 whose normal trigger or other firing member may be on the right side of the gun when looking from the rear thereof, means such as a spring and cable release means indicated generally by 67 are provided as shown for effecting left hand operation of the machine gun trigger or other firing member.

The dot-dash line 21, as shown in Fig. 2, for purposes of reference is perpendicular to the axis of rotation 26 of the shaft 24, and is the neutral reference axis with respect to the lateral oscillations of the mounting member 16 and the machine gun carried thereby.

The longitudinal axis of the machine gun barrel 48 is indicated by the dot-dash line 68 in Fig. 1, and preferably not only intersects the second axis of oscillation 20 but is parallel with the longitudinal axis of the mounting member 16, which when the mounting member is in the position shown in Fig. 2, coincides with the neutral reference axis 21 with respect to the lateral oscillations of the mounting member 16 and the machine gun carried thereby.

That is, the mounting member 16 and the machine gun carried thereby swing equal distances on opposite sides of the neutral reference axis 21, during each complete oscillation of the mounting member 16 and the machine gun carried thereby with respect to the axis 21 and the intermediate member 15.

As shown in Fig. 1, the dot-dash line 22 intersects the axis of upwards and downwards oscillation 18 and the axis of rotation 26 of the drive shaft 24. The dot-dash line 22 therefor is the neutral reference axis with respect to the swing of the eccentric 36 and the swinging away from and towards each other of the base member 14 and intermediate member 15 during each rotation of the shaft 24 and eccentric 36.

As shown in Fig. 1, the field tripod machine gun mount 12 has its yoke frame 49 and front strut member 51 stationarily supported on the ground indicated by the wavy line 69, at any desired fixed position.

The relative position of all the parts of the motion imparting apparatus 11 as shown in Figs. 1, 2, and 3 are neutral with respect to both the axis of reference 22 of upwards and downwards oscillation and the axis of reference 21 of lateral oscillation.

In using the machine gun equipment 10, with the parts in such neutral positions with respect to the axes of reference of oscillations, by manipulation of the handle 64 and the ratchet strut 56 controlled by the ratchet latch means 62, the base mounting member 14 of the motion imparting apparatus 11 may be swung laterally about the pivot means 55 and upwards and downwardly about the hinge means 54 so that a shot or shots fired from the machine gun 13 will strike an aim point in the center of an area desired to be covered. After such initial aiming of the gun 13, turning the crank 46 will cause the intermediate member 15 to oscillate upwards and downwardly with respect to the then stationary base member 14, and the mounting member 16 and the machine gun carried thereby will have a similar upwards and downwards oscillation, combined with lateral oscillations, which as shown will be four in number for each upwards and downwards oscillation.

Simultaneously pulling the trigger of the gun 13 as through the cable release means 67 will then cause automatic scatter fire of the bullets from the machine gun 13 covering an area which will be substantially rectangular and which will have the initial aiming point at its center.

The density of fire in the covered area will be determined by the range of the initial aiming point, and also by the magnitudes of the upwards and downwards and lateral oscillations.

The manual effort required by the machine gun operator to effect the automatic scatter fire of the machine gun 13 in the improved machine gun equipment 10 is thus very little as compared with the usual effort in operating a machine gun, as by manipulation of the handle 64 and the ratchet strut 56. The firing power of the machine gun equipment 10 is substantially greater therefor in covering the area of fire, than were the usual equipment used.

In the motion imparting apparatus 11 of the machine gun equipment 10, considering the base member 14 a reference base member, the intermediate member 15 oscillates towards and away from the reference base member 14, and the mounting member 16 and the machine gun 13 carried thereby also oscillates with the intermediate member 15 towards and away from the reference base member 14, and in addition the mounting member 16 and the machine gun 13 carried thereby oscillate laterally with respect both to the intermediate member 15 and the reference base member 14.

In other words the mounting member 16 has two different oscillations with respect to the reference base member 14.

After the initial aiming of the gun 13, the base member 14 remains stationary and consequently the shaft 24 oscillates towards and away from the base member 14.

In Figs. 6, 7, and 8 is shown a machine gun equipment indicated generally by 110 which includes a second embodiment of the motion imparting apparatus of the present invention indicated generally by 111 in combination with stationary gun mount feet each indicated generally by 112, and a machine gun indicated generally by 13 shown diagrammatically in part and being of more or less usual construction.

The machine gun equipment 110 is intended for use where it is not necessary to make an initial aim as in the machine gun equipment 10, as for example in the wings or fuselage of an airplane where the mounting feet 112 may be secured so that when the motion imparting apparatus 111 is in its neutral positon with respect to both its oscillations the barrel of the machine gun 13 will point straight ahead from the wings or fuselage, usually parallel with the propeller shaft or propeller shafts.

The motion imparting apparatus 111 is generally similar to the motion imparting apparatus 11, and includes parts which are substantially identical with the motion imparting apparatus which will not be again described or enumerated on the drawings except when necessary to describe parts which are different in the apparatus 111 than in the apparatus 11.

The motion imparting apparatus 111 differs from the motion imparting apparatus 11, in that in the apparatus 111 bearing means 125 are utilized for journalling the drive shaft 24 and the bearing means 125 are secured to and extend upwardly from the base member 114.

Consequently the drive shaft 24 in the motion imparting apparatus 111 is never displaced with respect to the base member 114 thereof, and consequently, the side cams 139-1 and 139-2 of the motion imparting apparatus 111 are eccentric as shown in the detached view of the side cam 139-2 illustrated in Fig. 8.

So constructing the motion imparting apparatus 111, permits the assembly of a battery indicated generally by B of equipments 110 as shown in Fig. 9, in which the drive shafts 24 of each adjacent pair of machine gun equipments 110 are connected by a connecting shaft 170 and the machine gun equipment 110 at one side may have its drive shaft 24 connected with the shaft 171 of a drive motor 172 which is electric powered as illustrated, so that the motion imparting apparatus of each of the machine gun equipments 110 in the battery B may be motor driven without requiring raising and lowering of the motor shaft, the drive shafts 24, and the connecting shafts 170, with respect to the base members 114.

This arrangement facilitates utilization of the present invention particularly in airplanes or similar positions.

The firing of the several machine guns 13 in the equipments 110 in the battery B, is effected by any usual mechanical or electrical remote control devices, not shown.

In Figs. 10, 11, and 12, the improved machine gun equipment indicated generally by 210 is generally similar to the equipment 10, in including a field tripod machine gun mount indicated generally by 12, and a machine gun indicated generally by 13 which have interposed therebetween in the same general manner as in the equipment 10, a third embodiment of the motion imparting apparatus of the present invention indicated generally by 211.

The motion imparting apparatus 211 includes parts which are substantially identical with the motion imparting apparatus 11 which will not be again described or enumerated on the drawings except when necessary to describe parts which are different in the apparatus 211 than in the apparatus 11.

In respect to these differences, in the motion imparting apparatus 211, the second rotation to oscillation converting means indicated generally by 228 includes a relatively large bevel gear 273 secured on the drive shaft 24 which is meshed with a bevel pinion 274 secured on the lower end of a shaft 275 journalled at the rear end of the intermediate member 215, the shaft 275 being angular to and as shown perpendicular to its shaft 24. At the upper end of the shaft 275 above the intermediate member 215 there is secured a crank 276 having a crank pin 277 operating in an elongated slot 278 formed in the mounting member 216.

The rotation to oscillation converting means 228 obviously operates to effect lateral oscillation of the mounting member 216 of the same character as the lateral oscillation of the mounting member 16 in the motion imparting apparatus 111.

In Fig. 13, a searchlight equipment is indicated generally by 310, and includes another of the motion imparting apparatuses 211, on the mounting member 216 of which is mounted a searchlight 313.

Each of the machine guns 13 and the searchlight 313 may be considered projecting devices.

In Fig. 14 a receiving device equipment is indicated generally by 410, and includes another of the motion imparting apparatuses 211 on the mounting member 216 of which there is secured a sound detector 413 which is a sound receiving device.

Both the searchlight 313 and the sound detector 413 of the equipments 310 and 410 may be utilized to cover an area in a manner similar to that in which the machine guns 13 of the several equipments 10, 110, and 210 are operated.

Any directional projecting device, such as the machine gun 13 or any other gun, the searchlight 313, or a directional radio transmitter, and any directional receiving device, such as the sound detector 413, a directional radio receiver, or a camera, may each be termed more broadly a directional functioning device, and by the present invention, any directional functioning device may be utilized to automatically and repetitively cover a predetermined area.

The embodiments of the present invention illustrated and described herein are by way of example, and the scope of the present invention is not limited to the same or to the particular details thereof but is commensurate with any and all novel subject matter contained herein which may at any time properly under the United States patent laws be set forth in the claims hereof or originating herein, and the elements of any such claims are intended to include their functional or structural equivalents.

I claim:

1. Motion imparting apparatus for a directionally functioning device and the like, including a base member and an intermediate member and a mounting member, the mounting member being adapted for having secured thereon a directionally functioning device, means operatively connecting the base member and the intermediate member for oscillation with respect to each other about a first axis, means operatively connecting the intermediate member and the mounting member for oscillation with respect to each other about a second axis, the mounting member also oscillating with the intermediate member about the first axis, and means including a rotary drive shaft operatively associated with the base member and the intermediate member and the mounting member for effecting the oscillations of the members, the oscillation effecting means including bearing means journalling the drive shaft on a selected one of the members, first rotation to oscillation converting means operatively interposed between the shaft and one of the other two members for effecting one of the oscillations, and second rotation to oscillation converting means operatively interposed between the shaft and the second of the other two members for effecting the other oscillation, the first rotation to oscillation converting means including an eccentric on the shaft and slot eccentric bearing means on the other member connected by the first rotation to oscillation converting means.

2. Motion imparting apparatus for a directionally functioning device and the like, including a base member and an intermediate member and a mounting member, the mounting member being adapted for having secured thereon a directionally functioning device, means operatively connecting the base member and the intermediate member for oscillation with respect to each other about a first axis, means operatively connecting the intermediate member and the mounting member for oscillation with respect to each other about a second axis, the mounting member also oscillating with the intermediate member about the first axis, and means including a rotary drive shaft operatively associated with the base member and the intermediate member and the mounting member for effecting the oscillations of the members, the oscillation effecting means including bearing means journalling the drive shaft on a selected one of the members, first rotation to oscillation converting means operatively interposed between the shaft and one of the other two members for effecting one of the oscillations, and second rotation to oscillation converting means operatively interposed between the shaft and the second of the other two members for effecting the other oscillation, the second rotation to oscillation converting means including cam and follower means interposed between the shaft and the members connected by the second rotation to oscillation converting means.

3. Motion imparting apparatus for a directionally functioning device and the like, including a base member and an intermediate member and a mounting member, the mounting member being adapted for having secured thereon a directionally functioning device, means operatively connecting the base member and the intermediate member for oscillation with respect to each other about a first axis, means operatively connecting the intermediate member and the mounting member for oscillation with respect to each other about a second axis, the mounting member also oscillating with the intermediate member about the first axis, and means including a rotary drive shaft operatively associated with the base member and the intermediate member and the mounting member for effecting the oscillations of the members, the oscillation effecting means including bearing means journalling the drive shaft on a selected one of the members, first rotation to oscillation converting means operatively interposed between the shaft and one of the other two members for effecting one of the oscillations, and second rotation to oscillation converting means operatively interposed between the shaft and the second of the other two members for effecting the other oscillation, the second rotation to oscillation converting means including side cam and follower means interposed between the shaft and the members connected by the second rotation to oscillation converting means.

4. Motion imparting apparatus for a directionally functioning device and the like, including a base member and an intermediate member and a mounting member, the mounting member being adapted for having secured thereon a directionally functioning device, means operatively connecting the base member and the intermediate member for oscillation with respect to each other about a first axis, means operatively connecting the intermediate member and the mounting member for oscillation with respect to each other about a second axis, the mounting member also oscillating with the intermediate member about the first axis, and means including a rotary drive shaft operatively associated with the base member and the intermediate member and the mounting member for effecting the oscillations of the members, the oscillation effecting means including bearing means journalling the drive shaft on a selected one of the members, first rotation to oscillation converting means operatively interposed between the shaft and one of the other two members for effecting one of the oscillations, and second rotation to oscillation converting means operatively interposed between the shaft and the second of the other two members for effecting the other oscillation, the second rotation to oscillation converting means including means operative to produce a plurality of oscillations for each oscillation produced by the first rotation to oscillation converting means.

5. Motion imparting apparatus for a directionally functioning device and the like, including a base member and an intermediate member and a mounting member, the mounting member being adapted for having secured thereon a directionally functioning device, means operatively connecting the base member and the intermediate member for oscillation with respect to each other about a first axis, means operatively connecting the intermediate member and the mounting member for oscillation with respect to each other about a second axis, the mounting member also oscillating with the intermediate member about the first axis, and means including a rotary drive shaft operatively associated with the base member and the intermediate member and the mounting member for effecting the oscillations of the members, the oscillation effecting means including bearing means journalling the drive shaft on a selected one of the members, first rotation to oscillation converting means operatively interposed between the shaft and one of the other two members for effecting one of the oscillations, and second rotation to oscillation converting means operatively interposed between the shaft and the second of the other two members for effecting the other oscillation, one of the rotation to oscillation converting means including crank and slot means operatively interposed between the shaft and one of the members operatively connected by the one rotation to oscillation converting means.

HURXTHAL F. FREASE.

REFERENCES CITED

The following references are of record in the file of this patent:

UNITED STATES PATENTS

| Number | Name | Date |
| --- | --- | --- |
| 428,088 | Gibbons et al. | May 20, 1890 |
| 619,824 | Fetzer | Feb. 21, 1899 |
| 110,949 | Barnes | Jan. 17, 1871 |
| 2,003,327 | Woodberry | June 4, 1935 |
| 2,100,790 | Taylor | Nov. 30, 1937 |
| 1,320,711 | Rasmussen | Nov. 4, 1919 |
| 1,482,062 | Babits | Jan. 29, 1924 |
| 2,319,839 | Tanovsky | May 25, 1943 |

FOREIGN PATENTS

| Number | Country | Date |
| --- | --- | --- |
| 218,806 | Great Britain | July 17, 1924 |